(12) United States Patent
Clifton

(10) Patent No.: US 9,235,881 B2
(45) Date of Patent: Jan. 12, 2016

(54) IDENTIFYING AND CORRECTING ANOMALIES IN AN OPTICAL IMAGE

(75) Inventor: David Clifton, Dunfermline (GB)

(73) Assignee: Optos PLC, Dunfermline (GB)

( * ) Notice: Subject to any disclaimer, the term of this patent is extended or adjusted under 35 U.S.C. 154(b) by 56 days.

(21) Appl. No.: 14/008,247

(22) PCT Filed: Mar. 27, 2012

(86) PCT No.: PCT/GB2012/050678
§ 371 (c)(1),
(2), (4) Date: Oct. 8, 2013

(87) PCT Pub. No.: WO2012/131358
PCT Pub. Date: Oct. 4, 2012

(65) Prior Publication Data
US 2014/0050416 A1  Feb. 20, 2014

(30) Foreign Application Priority Data

Mar. 31, 2011  (GB) .................................. 1105463.2

(51) Int. Cl.
| G06K 9/40 | (2006.01) |
| G06T 5/50 | (2006.01) |
| H04N 1/409 | (2006.01) |
| G06T 5/00 | (2006.01) |

(52) U.S. Cl.
CPC . *G06T 5/50* (2013.01); *G06T 5/002* (2013.01); *H04N 1/409* (2013.01); *G06T 2207/20224* (2013.01)

(58) Field of Classification Search
CPC .................... G06T 5/005; G06T 5/006; G06T 2207/20224; G06T 5/50; H04N 2013/0085; H04N 5/357

USPC ................................... 382/260, 274, 275, 312
See application file for complete search history.

(56) References Cited

U.S. PATENT DOCUMENTS 5,572,565 A * 11/1996 Abdel-Mottaleb ............. 378/37
6,643,410 B1 * 11/2003 Yu et al. ........................ 382/268
(Continued)

FOREIGN PATENT DOCUMENTS

| AU | 727553 B2 | 4/1999 |
| EP | 1038159 A2 | 9/2000 |

(Continued)

OTHER PUBLICATIONS

Bakstein, Hyne, "International Search Report" for PCT/GB2012/050678, as mailed Jul. 17, 2012, 6 pages.

(Continued)

*Primary Examiner* — Kanjibhai Patel
(74) *Attorney, Agent, or Firm* — Winstead PC

(57) ABSTRACT

An embodiment of the invention provides an apparatus and a method. An intensity gradient between first and second optical image data of an optical image produced by an optical scanning device is determined. The first optical image data is a first optical image pixel and the second optical image data is a second optical image pixel. An intensity gradient image comprising a plurality of intensity gradient image pixels is determined, each intensity gradient image pixel representing the magnitude of an intensity gradient. One or more anomalies in the optical image in dependence on the magnitude of the intensity gradient being greater than or equal to a threshold value is identified.

18 Claims, 7 Drawing Sheets

(56) References Cited

U.S. PATENT DOCUMENTS

| | | | |
|---|---|---|---|
| 6,983,065 B1 * | 1/2006 | Akgul et al. | 382/141 |
| 7,245,326 B2 * | 7/2007 | Orlick | 348/448 |
| 2003/0063183 A1 | 1/2003 | AuYeung et al. | |
| 2007/0127840 A1 | 6/2007 | Gardner et al. | |
| 2011/0019933 A1 | 1/2011 | Noda | |

FOREIGN PATENT DOCUMENTS

| | | |
|---|---|---|
| EP | 2103997 A2 | 9/2009 |
| JP | S61196676 A | 8/1986 |
| JP | H11261816 A | 9/1999 |

OTHER PUBLICATIONS

Patton, N., et al., "Retinal image analysis: Concepts, applications and potential", Progress in Retinal and Eye Research, Oxford, GB, vol. 25, No. 1, Jan. 2006, pp. 99-127.

Zhen, Ji, et al., "Simple and Efficient Soft Morphological Filter in Periodic Noise Reduction", TENCON 2006, 2006 IEEE Region 10 Conference, IEEE, PI, Nov. 14, 2006, pp. 1-4.

\* cited by examiner

IDENTIFYING AND CORRECTING ANOMALIES IN AN OPTICAL IMAGE

TECHNICAL FIELD

The invention relates to a method of identifying and correcting anomalies in an optical image produced by an optical scanning device. The invention relates also to a computer program and an apparatus configured to carry out the method.

BACKGROUND

Optical images produced by an optical scanning device are susceptible to anomalies that affect the integrity of the optical image. Such anomalies include striping, which refers to optical image artefacts that can manifest, for example as lines on the optical image in the direction of scanning.

Typically, the direction of scanning is vertically down a target area, which may produce striping vertically down the optical image, and striping may therefore be termed vertical striping. For another example it also possible, however, that striping may occur horizontally if the direction of scanning of the optical scanning device is horizontally across the target area.

When an optical scanning device produces an optical image a target area is scanned by for example a laser over a plurality of scan lines. Light is reflected from the target to allow the optical scanning device to produce an optical image. The target may be, for example, the retina of a human or animal subject, an existing image such as a photograph or any other object or surface of which an optical image is desired to be created.

In certain optical scanning devices, a laser is passed vertically over a target area to produce a first scan line. The laser is then moved horizontally in one direction and passed vertically over the target area again to produce a second scan line adjacent the first scan line. This process is repeated until all of the target area has been scanned. A polygonal mirror may be used in optical scanning devices of this type, each facet of the mirror being used to move the laser beam over a single scan line.

If one or more facets of a polygonal mirror are defective then a striping anomaly may occur. The striping anomaly may exhibit anomalous attenuated or accentuated brightness of one line of an optical image relative to adjacent lines of the optical image because a defective facet may disperse light from the laser beam such that a portion of the light is not reflected from the polygonal mirror onto the target area and therefore is not reflected from the target area to produce the correct/desired intensity of optical image data.

Striping can result in the polygonal mirror or optical scanning device being rejected. This results in a significantly reduced yield with a high cost to manufacturers of polygonal mirrors and optical scanning devices.

Current known solutions for determining the level of striping in an optical image include human observation in which an operative manually determines the level of striping by eye. If the level of striping is considered to be too high then the polygonal mirror or optical scanning device may be rejected.

SUMMARY

According to the invention in a first aspect there is provided a method comprising: determining an intensity gradient between first and second optical image data of an optical image produced by an optical scanning device, wherein the first optical image data is a first optical pixel and the second optical image data is a second optical image pixel; determining an intensity gradient image comprising a plurality of intensity gradient image pixels, each intensity gradient image pixel representing the magnitude of an intensity gradient; and identifying one or more anomalies in the optical image in dependence on the magnitude of the intensity gradient being greater than or equal to a threshold value.

The determination of an intensity gradient between first and second image data may allow the determination of a difference in intensity between the first optical image data and the second image data in an embodiment of the disclosure. Embodiments may thereby be able to determine if an area of the image comprises an anomaly if the magnitude of the intensity gradient is above a threshold. The term magnitude encompasses a value without sign, e.g. an intensity gradient of −4 has the same magnitude as an intensity gradient of +4. Therefore, in some embodiments a large negative intensity gradient may have a magnitude greater than the threshold. In other embodiments a large positive intensity value may have a magnitude greater than the threshold.

The anomalies may be striping anomalies or the like. However there can other types of image data anomalies as well, which can be corrected by the embodiment.

As used herein in some embodiments of the disclosure the term 'intensity gradient' encompasses any measure of the change or differential in intensity of optical image data spatially over an optical image. However it should be noted that the intensity gradient may comprise any type of differential calculation, merely for illustration purposes some examples are described below.

The intensity gradient may be determined between two separate image data within the same optical image, which allows identification of anomalies within the optical image using only data from the optical image. Data from other optical images is not necessary but it can be applied as well if needed. Further, the optical image may be a 'useful' or 'live' optical image. That is the optical image may be an image of a target area and not a test image. This means that anomalies may be determined on an optical image by optical image basis. Any subsequent correction is specific to one optical image. In such exemplary embodiments correction may not therefore be determined once based on a test image and applied uniformly to all subsequent images.

Optionally, the method may further comprise correcting the anomalies in the in the optical image in dependence on the magnitude of the intensity gradient.

Optionally, the first and second optical image pixels are adjacent.

By using pixels as the first and second optical image data then an embodiment may be able to determine the intensity gradient to a high degree of accuracy. The level of accuracy of the intensity gradient may be increased further when the first and second pixels are adjacent.

Optionally, the intensity gradient may comprise a first order differential.

The use of a first order differential may advantageously reduce the computation time of the intensity gradient.

Optionally, the intensity gradient may comprise a difference between an intensity of the first optical image pixel and an intensity of the second optical image pixel.

By using a difference between the intensity of the first and second optical image pixels the computation time of the intensity gradient may be reduced still further.

Optionally, identifying the anomalies may comprise identifying the second optical image data as anomalous in dependence on the intensity gradient between the first optical image data and the second optical image data being negative and having a magnitude greater than the threshold.

In an embodiment a negative intensity gradient signifies that the intensity between the first and second optical image data is reduced over the distance in the optical image between the first and second optical image data. If the magnitude of the reduction in intensity is greater than a threshold then the second optical image data may be considered to be anomalous as it may represent the attenuation of laser light due to a defective mirror facet.

Optionally, identifying the anomalies comprises identifying the first optical image data as anomalous in dependence on the intensity gradient between the first optical image data and the second optical image data being positive and having a magnitude greater than the threshold.

In embodiments of the disclosure a positive intensity gradient signifies that the intensity between the first and second optical image data is increased over the distance in the optical image between the first and second optical image data. If the magnitude of the increase in intensity is greater than a threshold then the first optical image data may be considered to be anomalous as it may represent the attenuation of laser light due to a defective mirror facet.

Optionally, each intensity gradient image pixel may represent an intensity gradient between a pair of optical image pixels adjacent each other in a direction transverse to the scanning direction of the optical scanning device.

In embodiments of the disclosure by building up an intensity gradient image the intensity gradient may be mapped across the whole area of the optical image. Using pixels adjacent in a direction transverse to the scanning direction may produce an intensity gradient image the rows of which represent the intensity gradient between adjacent pixels in the optical image in the direction transverse to the scanning direction. That is, intensity gradient image pixels may represent the intensity gradient between optical image pixels produced by two different facets of a polygonal mirror. The intensity of each intensity gradient image pixel may therefore represent the intensity gradient between each pair of adjacent pixels. As the intensity gradients are determined in the direction transverse to the scanning direction, striping effects due to defective facets of a polygonal mirror may be identified easily as the intensity gradient image will show the striping as lines where the intensity gradient is large.

Optionally, the method may further comprise running a modulo-n averaging filter on each row of intensity gradient image pixels to produce an averaged intensity gradient image comprising a plurality of averaged intensity gradient image pixels, and wherein n is an integer corresponding to the pixel spacing between striping anomalies.

In embodiments of the disclosure running a modulo-n averaging filter allows the attenuation of optical image data not caused by anomalies relative to optical image data caused by anomalies. The specific characteristics of the modulo-n filter are explained in greater detail below.

Optionally, identifying anomalies in the optical image may be in dependence on the intensity of an averaged intensity gradient image pixel being greater than or equal to the threshold.

In embodiments of the disclosure after the production of an averaged intensity gradient image, each pixel may be compared with a threshold and it is this comparison that may determine whether anomalies are identified. As the background image has been attenuated by the modulo-n averaging filter then the anomalies are more pronounced and so the value of the threshold may be reduced, which may decrease the level of intensity at which an anomaly may be detected.

Optionally, n may be the number of facets on a polygonal mirror comprised in the optical scanning device.

In embodiments of the disclosure as explained above, the particular anomaly in optical images known as striping may occur with regular pixel (or scan line) spacing. Therefore, by setting n equal to the number of facets of a polygonal mirror then striping may be more easily detected.

Optionally, running the modulo-n filter may comprise running the filter in forwards and backwards directions.

Optionally, running the modulo-n filter may further comprise averaging the results of the forwards and backwards filtering.

In embodiments of the disclosure by running the filter in forwards and backwards directions, the edge effects of the filtering process are corrected for.

Optionally, running the modulo-n filter may further comprise averaging the results of the forwards and backwards filtering.

Optionally, identifying anomalies in the optical image may be in dependence on the intensity of a first averaged intensity gradient image pixel having the same intensity as a second averaged intensity gradient image pixel in a corresponding position of the row above and/or below of the averaged intensity gradient image.

In embodiments of the disclosure as each of the rows of the averaged intensity gradient image may represent the intensity gradient between pixels adjacent in a direction transverse to the direction of scanning, striping may also be seen in averaged intensity gradient image pixels above and/or below. This information may be used to reduce the number of false anomaly identifications.

Additionally or alternatively, an intensity gradient image pixel of the intensity gradient image (i.e. before running the modulo-n averaging filter) may be identified as anomalous if the intensity gradient image pixels above and or below are also identified as anomalous.

Optionally, the method may further comprise producing a mask comprising the averaged intensity gradient image.

Optionally, the method may further comprise correcting the optical image to remove anomalies by subtracting the mask from the optical image.

In embodiments of the disclosure by producing a mask for correcting the image to remove anomalies, the correction of each optical image may be specific to that optical image. That is, the anomalies may be determined based on the optical image data alone and corrected for without the need for further data or a test image. Therefore, if striping effects change with time then the changed effect will be corrected. Correction of an optical image using a mask allows the continued use of a polygonal mirror and/or optical scanning device despite defects in one or more facets of the polygonal mirror.

According to the invention in a second aspect there is provided a computer program product configured to store computer program code executable to carry out the method described herein.

According to the invention in a third aspect there is provided an apparatus comprising a processor configured to carry out the method described herein.

In certain embodiments an imaging device comprises the apparatus described herein.

DETAILED DESCRIPTION

Exemplary embodiments are described below with reference to the accompanying drawings in which.

Generally, embodiments of the disclosure relate to a method of detecting anomalies in an optical image produced by an optical scanning machine. The disclosure involves determining an intensity gradient between image data from different areas of an optical image and comparing the intensity gradient to a threshold to identify anomalies in the optical image.

If the magnitude of the intensity gradient is greater than the threshold then one of the first and second optical image data may be identified as anomalous.

Figure 1:
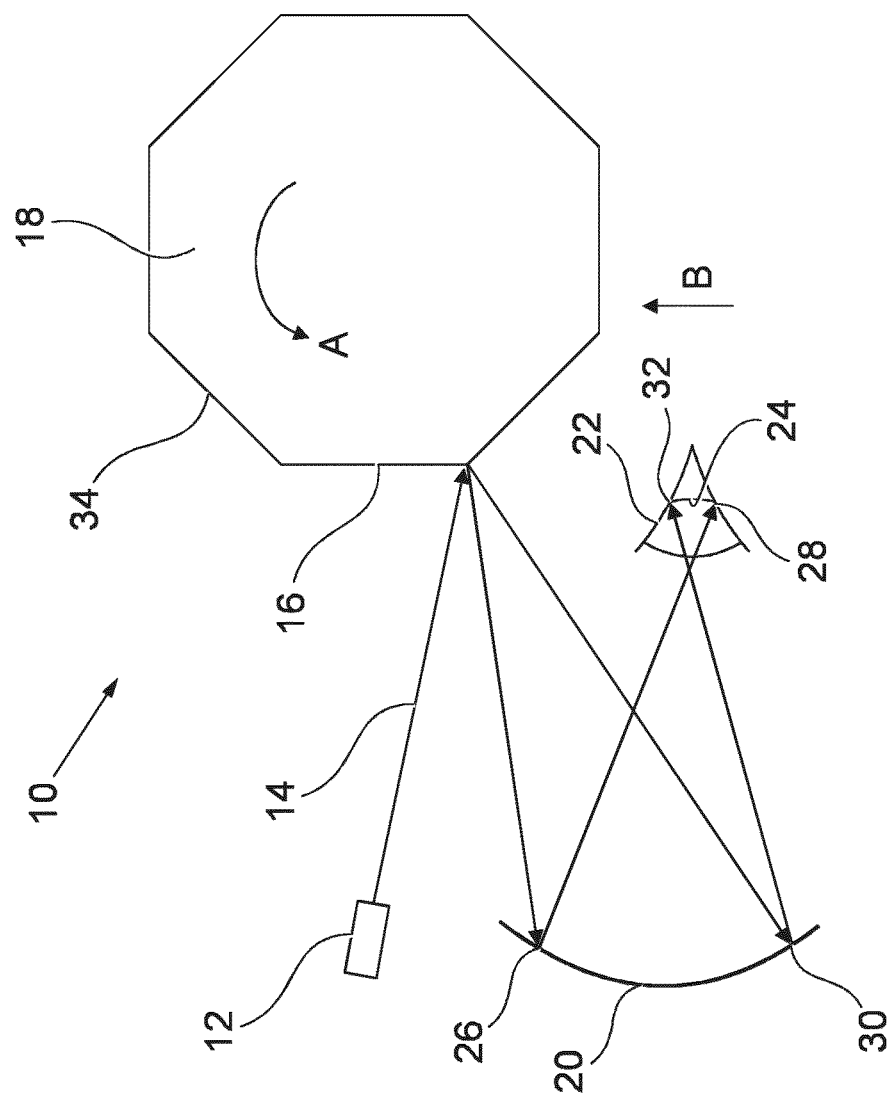
FIG. 1 is a schematic diagram showing a known polygonal mirror and laser arrangement.

FIG. 1 shows part of an optical scanning device 10. The optical scanning device 10 of FIG. 1 is arranged to scan the retina of a human or animal subject. However, embodiments of the invention may apply equally to other types of optical scanning device.

Referring to FIG. 1, a laser transceiver unit 12 is arranged to direct a laser beam 14 onto a facet 16 of a polygonal mirror 18. The laser beam 14 is reflected onto a concave mirror 20 and then through the pupil of a subject's eye 22 onto the retina 24. The retina 24 in FIG. 1 represents the target area of the optical scanning device 10. The light of the laser beam 14 is reflected back along the same path to be received at the laser transceiver unit 12 where it can be processed by a processing apparatus (not shown) into an optical image.

With the polygonal mirror in the orientation shown in FIG. 1, the laser beam 14 is at the top 26 of the concave mirror 20 and is reflected to the bottom 28 of the retina 24. As the polygonal mirror 18 is rotated in the direction of arrow A, then the laser beam 14 is moved vertically down the concave mirror 20 and vertically up the retina 24 in the direction of arrow B until it reaches the bottom 30 of the concave mirror 20 and the top 32 of the retina 24. This action produces a first scan line.

Once the laser beam 14 reaches the top 32 of the retina 24 the polygonal mirror 14 has rotated such that the laser beam 14 is reflected from the next facet 34 and the laser beam 14 is returned to the top 26 of the concave mirror 20 and the bottom 28 of the retina 24.

At this point the laser beam 14 is moved horizontally (i.e. into or out from the page). The continued rotation of the polygonal mirror 18 in the direction of arrow A allows the laser beam 14 to scan the retina 24 from bottom 28 to top 32 in the direction of arrow B to produce a second scan line adjacent the first.

If one or more facets of a polygonal mirror 18 is defective then a striping anomaly may result in the direction of arrow B, i.e. the direction of the scan, on the resulting optical image.

If only a single facet of the polygonal mirror 18 is defective then the striping anomaly will occur across the optical image with a regularity common to the number of facets on the polygonal mirror 18. For example, the polygonal mirror 18 of FIG. 1 is shown to have eight facets. Therefore if for example facet 13 is defective then the striping anomaly would occur at every eighth scan line, i.e. every scan line for which the laser beam 14 is reflected off the facet 13.

FIG. 1 shows a polygonal mirror having eight facets as this number clearly shows the flat profile of each facet. More typically, polygonal mirrors used in optical scanning devices may have sixteen facets. Therefore the striping anomaly may occur every sixteenth scan line. However, other embodiments relate to arrangements of optical scanning devices polygonal mirrors may have other numbers of facets.

Typically, a scan line represents a pixel width in the optical image produced by the optical scanning device. In such arrangements, the striping anomaly will occur with regular pixel spacing.

Figure 2:
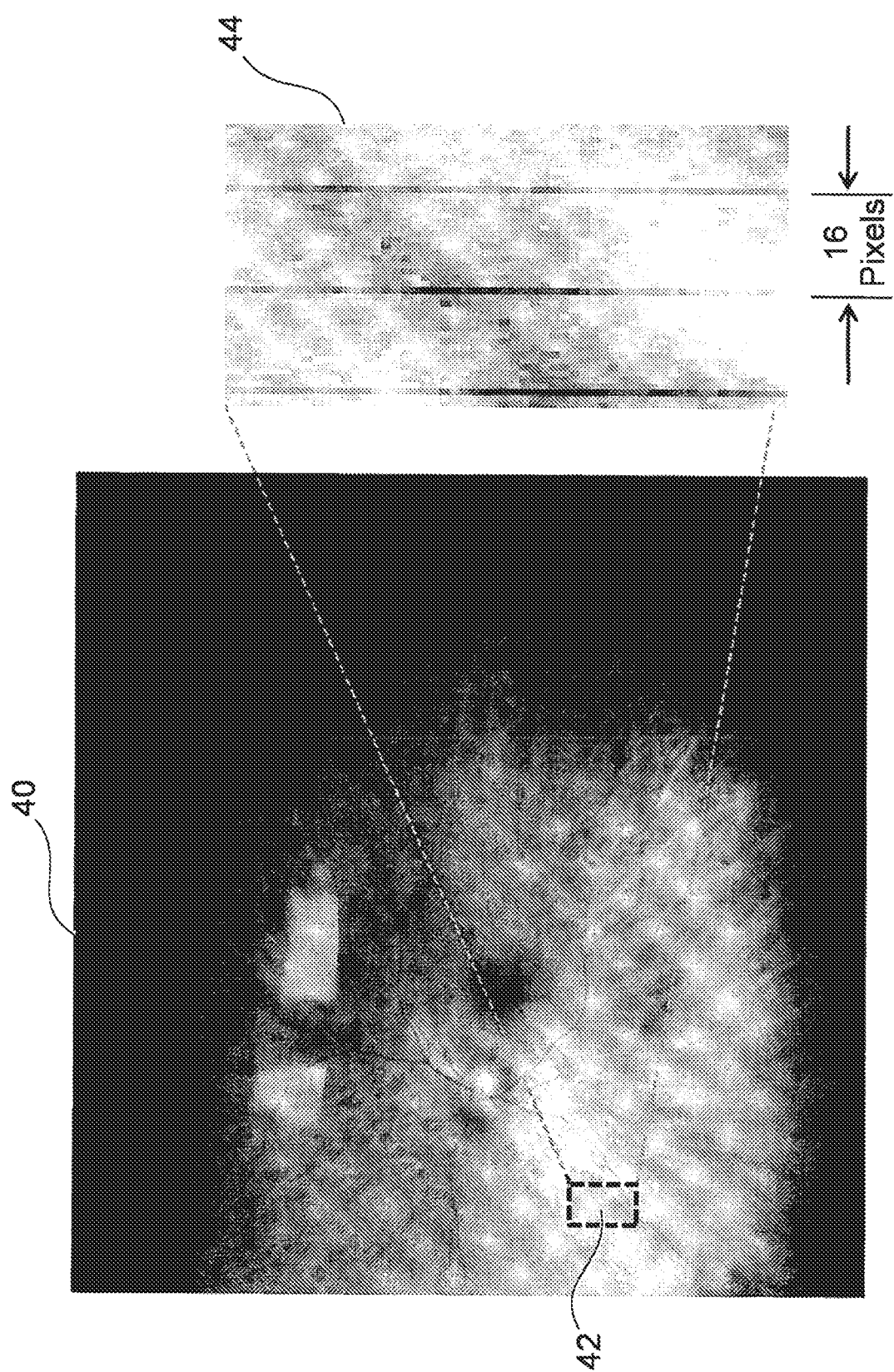
FIG. 2 is a representation of an optical image of a retina of a human or animal subject that exhibits a striping anomaly.

Referring to FIG. 2, an example of an optical image 40 of a retina 24 is shown. An area 42 of the optical image 40 is enlarged 44 to show the striping anomaly effect referred to above. As shown in FIG. 2, the spacing between each stripe is amount of pixels, for example 16, which is thus equal to the number of facets on the polygonal mirror.

Figure 3:
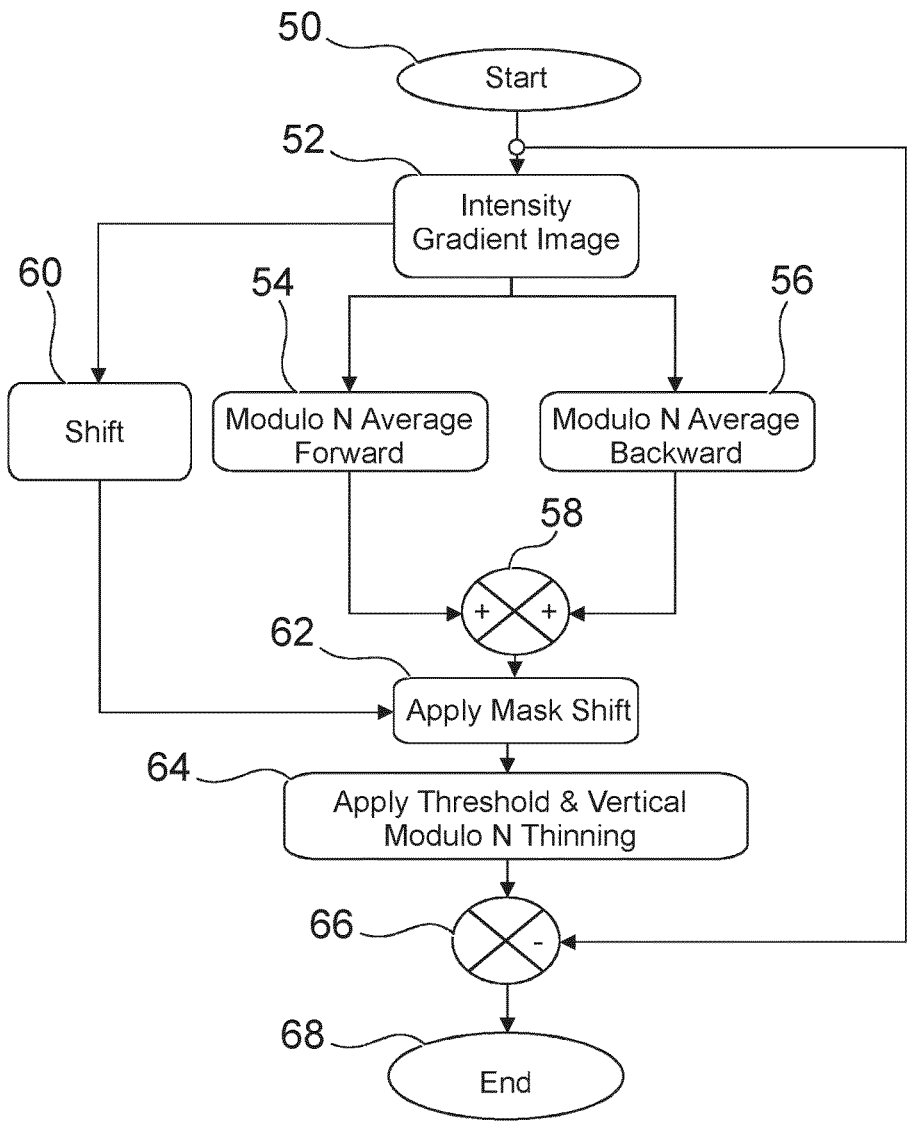
FIG. 3 is a flow diagram of an exemplary embodiment of the method disclosed herein.

Referring to FIG. 3, there is shown a flow diagram of an exemplary embodiment of the method disclosed herein.

At step 50 the embodiment of the method starts with an optical image 40 that exhibits striping anomalies, for example as described above. The striping anomaly in the case of the exemplary method of FIG. 3 has a modulo-n spacing. That is, the striping anomalies occur with regular 'n' pixel spacing.

At step 52 an intensity gradient image is produced. The intensity gradient image comprises a series of intensity gradient image pixels each of which has an intensity that corresponds to the intensity gradient between first and second optical image data from the optical image 40. Another embodiment for the production of the intensity gradient image is described below.

Figure 4:
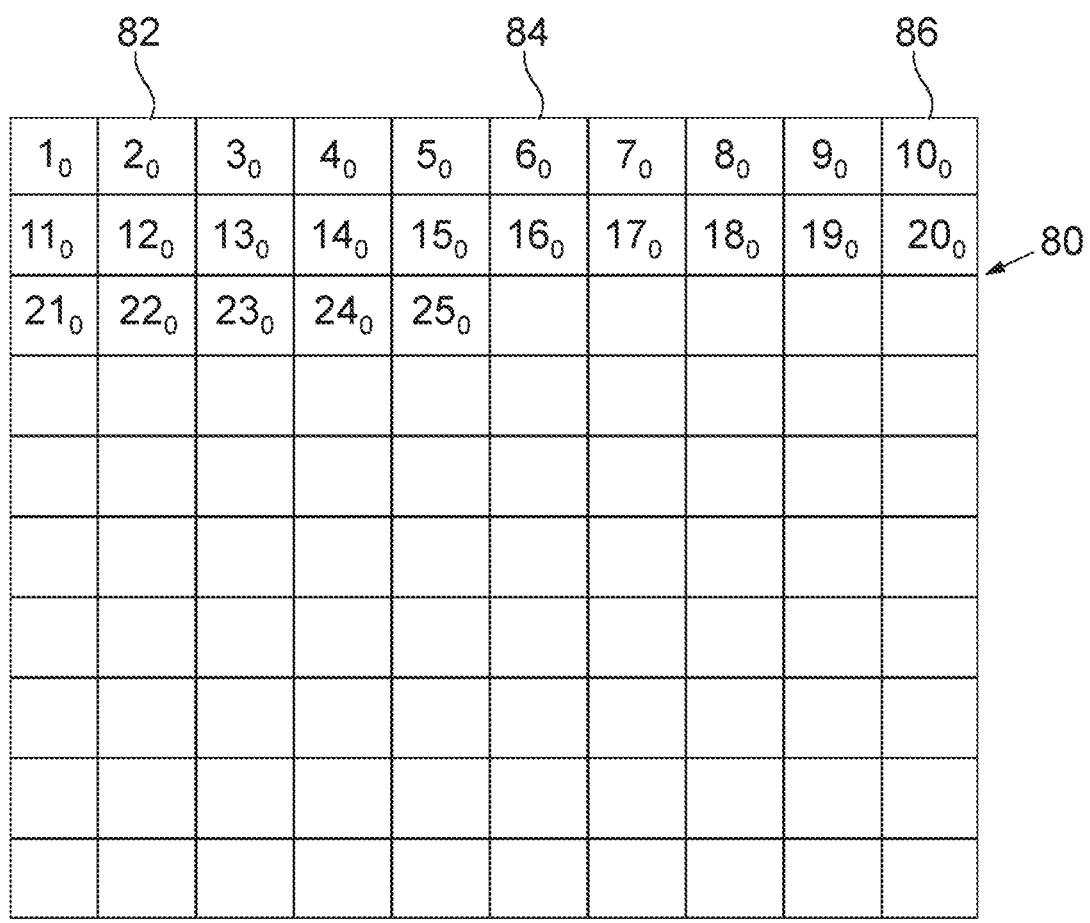
FIG. 4 is a schematic diagram of a portion of an optical image.

FIG. 4 shows a portion of an optical image 80 that is 10 optical image pixels by 10 optical image pixels in size. The portion of an optical image 80 shown in FIG. 4 is intended only for demonstration of the method disclosed herein. Typically, optical images may comprise many millions of optical image pixels. An exemplary optical image may comprise 1344×1344 pixels. Another exemplary optical image may comprise 3072×3900 pixels.

Each optical image pixel of the optical image 80 will have an intensity value. In certain embodiments of the method disclosed herein, an optical image 80 may comprise pixels the intensity of which may be one of 256 possible levels, typically from 0-255. However, in certain other embodiments an optical image pixel may be one of any number of levels, for example an optical image pixel may be one of 128 levels, 512 levels or 1024 levels, etc.

Each of the optical image pixels has a separate intensity level such that when all optical image pixels are viewed together the optical image 80 can be seen.

In the example of FIG. 4, the second column 82, the sixth column 84 and the tenth column 86 have low intensity values relative to the other optical image pixels. The relatively low intensity values of the second, sixth and tenth columns may be due to the striping anomaly described above being present in the optical image 80. The scanning direction of the optical scanning device that produced the optical image 80 can therefore be seen to be in the direction of the columns as explained above. Further, the second 82, sixth 84 and tenth 86 columns have a four column (or pixel) spacing such as may be produced from a four facet mirror in which one facet is defective. As with the size of the portion of the optical image 80 shown in FIG. 4, the four line spacing is for demonstration purposes only and other line spacings are applicable, for example a spacing for striping anomalies with sixteen columns (or pixels). The striping anomaly may occur at a spacing equivalent to the number of facets of a polygonal mirror.

The first 25 optical image pixels of FIG. 4 have been numbered from $1_O$ to $25_O$ as they will be used to demonstrate the exemplary embodiment of the method disclosed herein.

An intensity gradient may be determined between each adjacent optical image pixel in a direction transverse to the scanning direction, i.e. across the rows of the portion of optical image 80 shown in FIG. 4. The intensity gradient represents the change in intensity value with distance across the row of the optical image 80. In certain embodiments of the method disclosed herein the intensity gradient may be a difference between the intensity values for adjacent optical image pixels. This method essentially comprises the finite difference method, a technique of numerical differentiation following the formula:

$$dI = \frac{I2 - I1}{h}$$

Where dI is the differential of the intensity (or intensity gradient), I1 is the intensity value of the first optical image pixel, I2 is the intensity value of the second optical image pixel and h is the distance along the row. When dI is taken as a difference between adjacent optical image pixels, the distance h is taken to be one (pixel) and dI is therefore I2−I1.

However, in other embodiments of the method disclosed herein dI may be calculated using pixels which are spaced apart. For example, first optical image pixel may be from the first column and the second optical image pixel may be from the third column; in that example h would be two.

In yet further embodiments of the method disclosed herein an intensity gradient may be calculated using higher order numerical differentiation techniques such as the five point method. Other numerical differentiation techniques are within the scope of the disclosed method.

In the examples given above, the first optical image data comprise a single optical image pixel and the second optical image data comprise a single optical image pixel. In other embodiments of the disclosed method, the first and second optical image data may comprise groups of optical image pixels.

By differencing each adjacent optical image pixel in a row of the optical image 80 (i.e. in a direction transverse to the scanning direction) intensity gradient image pixels may be produced. A plurality of intensity gradient image pixels may together comprise an intensity gradient image.

Figure 5:
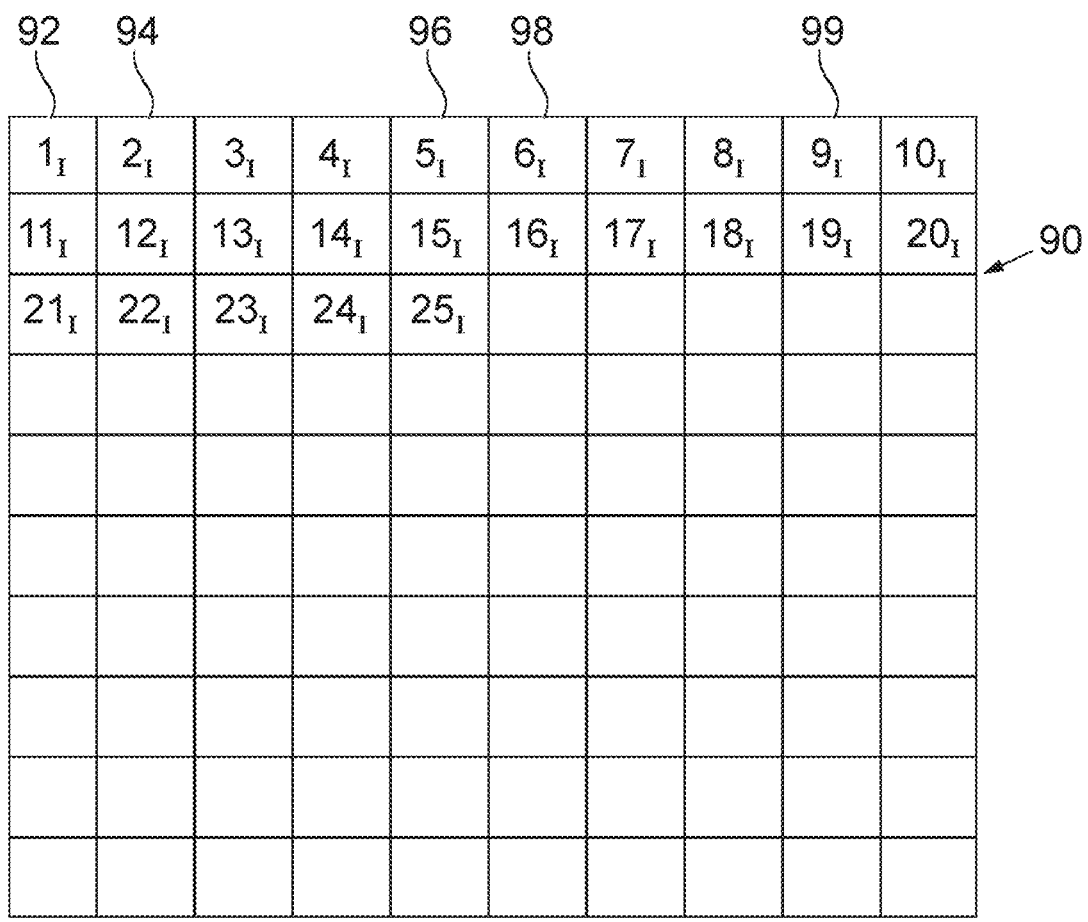
FIG. 5 is a schematic diagram of a portion of an intensity gradient image.

FIG. 5 shows a portion of an intensity gradient image 90 corresponding to the portion of an optical image 80 of FIG. 4. Each pixel of the intensity gradient image 90 comprises a value of an intensity gradient between adjacent optical image pixels in a row. The first 25 intensity gradient image pixels have been labelled $1_I$ to $25_I$.

Using, for example the finite difference method formula above to determine the value of the each intensity gradient pixel, the first intensity gradient image pixel $1_I$ is determined by subtracting the first optical image pixel $1_O$ from the second optical image pixel $2_O$. The value of h in the formula is 1 as the optical image pixels are adjacent. This process can be continued across an entire row of optical image pixels, wherein:

$1_I = 2_O - 1_O$ $2_I = 3_O - 2_O$ $3_I = 4_O - 3_O$ $4_I = 5_O - 4_O$ $5_I = 6_O - 5_O$ $6_I = 7_O - 6_O$ $7_I = 8_O - 7_O$ $8_I = 9_O - 8_O$ $9_I = 10_O - 9_O$

Because two or more optical image pixels are required to determine each intensity gradient pixel, there are insufficient optical image pixels in a row to determine a value for all intensity gradient image pixels in a corresponding row. Therefore, the last intensity gradient pixel in each row of the intensity gradient image 90 is 'padded' with a zero. Therefore, the intensity gradient image 90 may be considered to be left shifted by one pixel with respect to the optical image 80.

In other embodiments the first intensity gradient pixel in each row may be padded with a zero, in which case intensity gradient image pixel $2_I$ may be determined by subtracting optical image pixel $1_O$ from optical image pixel $2_O$. The remainder of the row will be determined accordingly. In such embodiments the intensity gradient image 90 may be considered to be right shifted by one pixel with respect to the optical image 80.

The above process is repeated for all rows of the optical image 80 to produce an intensity gradient image 90. In certain embodiments of the method disclosed herein, an intensity gradient image 90 may comprise intensity gradient image pixels the intensity of which may be one of 256 possible levels, typically from 0-255. However, in certain other embodiments an intensity gradient image pixel may be one of any number of levels, for example an intensity gradient image pixel may be one of 128 levels, 512 levels or 1024 levels.

The intensity level of an intensity gradient image pixel represents the intensity gradient between a first pixel and a second pixel.

The second 82, sixth 84 and tenth 86 columns of the optical image 80 comprise low intensity values as they exhibit a striping anomaly. Therefore, the first column 92 and the second column 94 of the intensity gradient image will comprise intensity gradient values with a high magnitude. The sign of the intensity gradient value of intensity gradient image pixels in the first column 92 is negative. The sign of the intensity gradient value of intensity gradient image pixels in second column 94 is positive. This effect is repeated at the fifth column 96 and sixth column 98, and at the ninth column 99. The tenth column is padded with zeroes as described above. The spacing of the intensity gradient image pixels with large magnitude intensity gradient values is dependent on the spacing of the low values of the optical image pixels in a row of the optical image 80.

For the avoidance of doubt it is noted again that the FIGS. 4 and 5 are included to illustrate the method disclosed herein and are not representative of the size of an optical image or intensity gradient image. Optical images often comprise millions of pixels and the striping anomalies will more commonly exhibit a sixteen pixel spacing. The method disclosed herein will be readily scaled to be used on larger images with greater striping anomaly spacings by the skilled person.

Because the intensity gradient value of the intensity gradient image pixel $1_I$ is negative and large (i.e. greater than a threshold as explained below) then the optical image pixel $2_O$ may be identified as being anomalous. Also, because the intensity gradient value of the intensity gradient image pixel $2_I$ is positive and large (i.e. greater than a threshold as explained below) then the optical image pixel $2_O$ may be identified as being anomalous.

In some embodiments, if a large positive gradient value is identified adjacent a large negative value as described for image gradient pixel columns 92 and 94 then the large negative value is removed before production of a mask (explained below).

Referring to FIG. 3, at step 54 a modulo-n averaging filter is passed over each row of the intensity gradient image. A modulo-n averaging filter is configured to average a plurality of pixel values, the pixels being spaced by an integer number n.

The window size of the modulo-n averaging filter refers to the number of pixel values to be averaged.

Taking the portion of an intensity gradient image 90 of FIG. 5, n may be equal to four to produce a modulo-4 averaging filter. The modulo-4 averaging filter may be configured to average a plurality of intensity gradient image pixel values along a row of the intensity gradient image 90 at four pixel spacings. That is, the modulo-4 averaging filter may average the intensity gradient image pixel numbers $1_I$, $5_I$ and $9_I$. The window size of the modulo-4 filter in this instance is therefore three and the sum of the pixels $1_I$, $5_I$ and $9_I$ is divided by three to obtain the average.

In embodiments n may be equal to sixteen to produce a modulo-16 averaging filter. That is the modulo-16 averaging filter may average the first, seventeenth, thirty-third, forty-ninth pixels and so on. In other embodiments n may be set to any integer value. The value of n may be equal to the number of facets on an optical polygonal mirror. In this way the modulo-n filter may be configured to attenuate the image information in the intensity gradient image such that the striping anomaly artefacts are pronounced compared to the image information. In effect, the image artefacts may be regarded as noise for the purposes of identifying anomalies in the optical image and the modulo-n averaging filter is a noise reduction filter as it reduces the level of this 'noise'.

In certain embodiments the window size of the modulo-n averaging filter may be ten pixels. In other embodiments the window size of the modulo-n averaging filter may be between two pixels and twenty pixels. In other embodiments the window size of the modulo-n averaging filter may be between five pixels and fifteen pixels. In other embodiments the window size of the modulo-n averaging filter may be between eight pixels and twelve pixels.

If striping anomalies have occurred in the optical image 80 at a pixel spacing equal to the value of n in the modulo-n averaging filter then the image information from the intensity gradient image 90 will be reduced and the striping anomaly artefacts in the intensity gradient image 90 will be more pronounced relative to the image information. This is because the intensity gradient image pixels with large intensity gradient values of the same sign are at the same pixel spacing as the value of n. Therefore, as the modulo-n averaging filter is passed over a row of the intensity gradient image 90 the intensity gradient image pixels averaged by the filter will contain either all image information, which will average out to approximately zero over a window of e.g. ten pixels, or all striping anomaly artefacts, which will be biased in one direction and large.

By way of example, below are listed the first two modulo-n averaging filter calculations for the portion of an intensity gradient image 90 of FIG. 5. In the example, the value of n is 4 and the window size is 3.

| Window | | | Averaging calculation |
|---|---|---|---|
| $1_I$ | $5_I$ | $9_I$ | $(1_I + 5_I + 9_I)/3$ |
| $2_I$ | $6_I$ | $10_I$ | $(2_I + 6_I + 10_I)/3$ |

The process is continued until the modulo-n averaging filter has passed over an entire row of the intensity gradient image 90. The same process is then repeated for all remaining rows of the intensity gradient image 90.

The outputs of the calculations of the modulo-n averaging filter form averaged intensity gradient image pixels of an averaged intensity gradient image.

Figure 6:
FIG. 6 is a schematic diagram of a portion of an averaged intensity gradient image.

FIG. 6 shows an averaged intensity gradient image 100. Each averaged intensity image pixel of the averaged intensity gradient image 100 comprises a value output from the modulo-n averaging filter. The first twenty-five averaged intensity image pixels are numbered $1_{AI}$–$25_{AI}$. The intensity gradient image pixel $1_A$, will comprise the first modulo-n averaging filter output, i.e. $(1_I+5_I+9_I)/3$. The intensity gradient image pixel $2_{AI}$ will comprise the second modulo-n averaging filter output, i.e. $(2_I+6_I+10_I)/3$. This pattern is repeated for the remaining averaged intensity gradient image pixels in the first row, and subsequently for the remaining rows in the averaged intensity gradient image 100.

As the modulo-n averaging filter reaches the end of an intensity gradient image 90, the number of intensity gradient image pixels remaining in a row of the intensity gradient image 90 may be too few to obtain an accurate result from the modulo-n averaging. For example, in the example of FIG. 6, the third averaged intensity image pixel in the first row $3_{AI}$ will be determined by the calculation $(3_I+7_I)/2$ as there is no eleventh intensity gradient image pixel to contribute to the average. This effect is amplified as the averaging filter gets closer and closer to the edge of the intensity gradient image and the number of pixels that contribute to the average decreases further. Errors in averaging therefore occur and increase toward the edge of the averaged intensity gradient image 100. These errors may be termed "edge effects".

For the avoidance of doubt it is again stressed that typical images used in the exemplary embodiment of the method described herein may comprise millions of pixels in a row. The vast majority of pixels of an averaged intensity gradient image 100 will therefore be determined using sufficient number of intensity gradient image pixels. Edge effects will therefore not become apparent until very close to the edge of the averaged intensity gradient image 100.

In an embodiment, the modulo-n averaging filter may be processed in forward and backward directions. This may mitigate the edge effect errors seen in the averaged intensity gradient image 100 as explained below. In this regard, the forward direction of the modulo-n averaging filter is considered to relate to passing the filter across a row of an intensity gradient image 90 in a first direction and the backward direction is considered to relate to passing the filter across a row of an intensity gradient image 90 in a second direction opposite the first direction.

Referring to FIG. 3, the edge effects are mitigated by running the modulo-n averaging filter in a forward direction 54 and also in a backward direction 56. The process of running the filter in a backward direction 56 is the same as running the filter in a forward direction except that the filter begins at the right hand edge of an intensity gradient image 90 and passes from right to left. For example, if a filter is run in a backwards direction then the averaged intensity gradient image pixel $10_{AI}$ will be determined by $(10_I+6_I+2_I)/3$ and averaged intensity gradient image pixel $9_{AI}$ will be determined by $(9_I+5_I+1_I)/3$ and so on.

When the modulo-n averaging filter is processed in forward and backward directions then first and second averaged intensity gradient images are produced respectively. The first and second averaged intensity gradient images may then themselves be averaged together 58 to produce a third averaged intensity gradient image in which the edge effects are mitigated. Combining the first and second averaged intensity gradient images mitigates the edge effects as edge effects are apparent only on the right hand edge of the first averaged intensity gradient image, and are only apparent on the left hand edge of the second averaged intensity gradient image.

At step 60 the direction of a shift that is to be applied to the averaged intensity gradient image is determined. The shift must be applied because the determination of the intensity gradient image pixels for the intensity gradient image 80 results in one column of pixels being padded with zeroes as explained above. Therefore, the intensity gradient image is shifted one pixel to the left or right relative to the optical image. The third averaged intensity gradient images are also therefore shifted by one pixel to the left or right relative to the optical image to counter this.

The shift at step 60 may be applied because the measure of the image gradient discussed above introduces a local phase shift relative to the original image. The direction of the local phase shift may be corrected by shifting to the right for cases of positive image gradients (e.g. for light striping on a dark image) or to the left for negative image gradients (e.g. for dark striping on a light image). Therefore, a shift to the right or left by one column may be undertaken. In reality it may be that dark striping on a light image is more common than light striping on a dark image and therefore in embodiments of the invention the method may default to a one column shift to the left.

The left or right shift is then applied 62 to the third averaged intensity gradient image to align it with the optical image 80. This step allows the third averaged intensity gradient image to be used as a mask as explained below.

At step 64, a threshold and modulo-n thinning algorithm is applied to the third averaged intensity gradient image.

The threshold is applied to determine candidate anomalous pixels in the third averaged intensity gradient image. The result of the modulo-n averaging filter results in image artefact averaged intensity gradient image pixels that have intensity values with a magnitude of approximately zero. In contrast, the anomalous averaged intensity gradient image pixels have intensity values with a magnitude greater than zero. Therefore, a threshold may be set at a value greater than zero and all pixels that are above the threshold may be identified as candidate anomalous pixels.

In certain embodiments, the threshold may be set at a value between 1 and 10. In other embodiments the threshold may be set at a value between 1 and 5. In other embodiments the threshold may be set at a value of 2. In other embodiments the threshold may be set at a value of 5.

The thinning algorithm compares averaged intensity gradient image pixels of one row with averaged intensity gradient images correspondingly placed on another row above and/or below. Anomalous averaged intensity gradient image pixels are determined in dependence on a first averaged intensity gradient image pixel being identified as a candidate anomalous averaged intensity gradient image pixel and the averaged intensity gradient image pixel correspondingly positioned in the row above and/or below the first averaged intensity gradient image pixel also being identified as a candidate anomalous averaged intensity gradient image pixel. This reduces the number of false identifications of anomalous averaged intensity gradient image pixels.

If anomalies in the optical image are as a result of striping then the pixels above and below anomalous pixels should also be anomalous, to a high probability, and exhibit the striping artefacts.

For example, referring to FIG. 6, if the averaged intensity gradient pixel $12_{AI}$ has an intensity value with a magnitude greater than the threshold then it is identified as a candidate anomalous averaged intensity gradient image pixel. However, if either or both of averaged intensity gradient image pixels $2_{AI}$ and $22_{AI}$ have intensity values with magnitudes that are not greater than the threshold then averaged intensity gradient pixel $12_{AI}$ may be determined not to be anomalous. If both averaged intensity gradient image pixels $2_{AI}$ and $22_{AI}$ have intensity values with magnitudes that are greater than the threshold then averaged intensity gradient pixel $12_{AI}$ may be determined to be anomalous.

The magnitude of the averaged intensity gradient image pixels that are determined to be anomalous remains unchanged. However, those candidate anomalous averaged intensity gradient image pixels that are determined not to be anomalous have their values amended to be zero.

Figure 7:
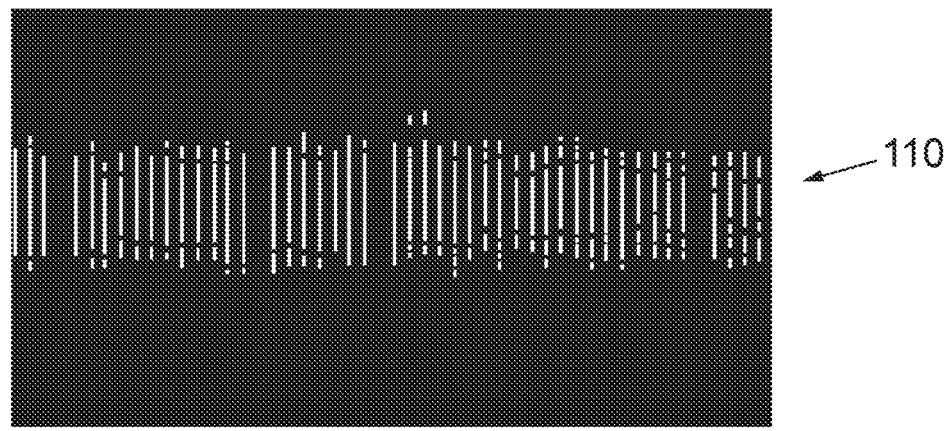
FIG. 7 is a representation of a mask for mitigating a striping anomaly.

Application of the thinning algorithm to the third averaged intensity gradient image may result in the production of a mask 110 as shown in FIG. 7. In the mask, those mask pixels that are determined to be anomalous have large values approximately opposite the values of the anomalous optical image pixels in the optical image. The remaining pixels are set to zero. Therefore, if the anomalies in the optical image are due to striping then the mask may comprise a black background with lighter coloured vertical stripes as shown in FIG. 7.

Referring to FIG. 3 the mask may be subtracted 66 from the optical image. This has the effect of mitigating the striping anomaly in the optical image to produce 68 a corrected optical image.

In embodiments of the method disclosed herein a computer program product may be configured to store computer program code to execute the method described herein. The computer program product may for example comprise a computer hard drive, a floppy disc, CD, DVD, flash memory or other data media. The computer program product may alternatively or additionally comprise programmable logic, FPGAs, ASICs and/or firmware.

In other embodiments of the method disclosed herein an apparatus such as a computer or computing device may comprise a microprocessor configured to carry out the method described herein. The apparatus may also be located within an imaging device.

Figure 8:
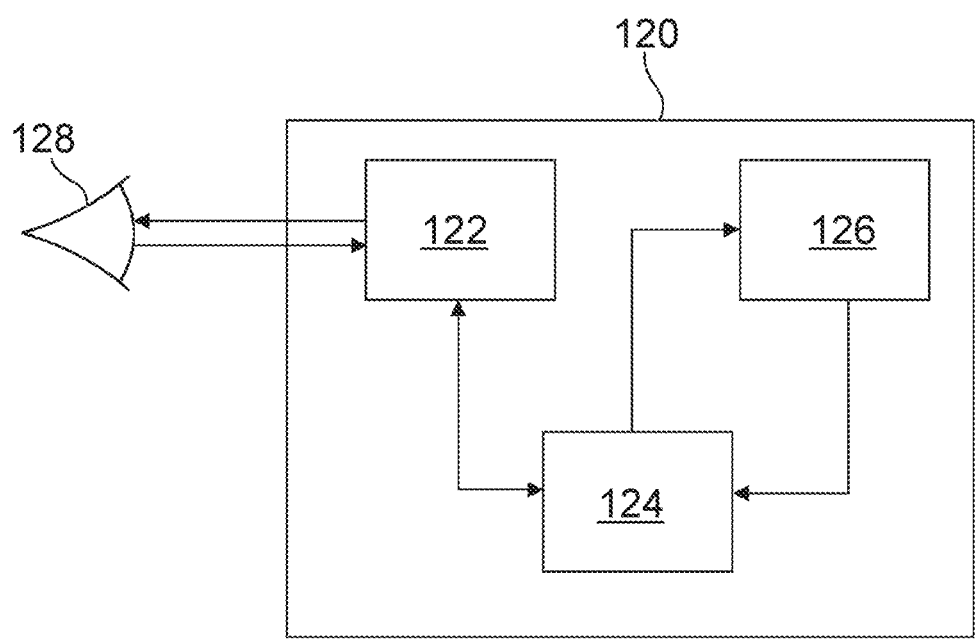
FIG. 8 is a schematic diagram of an optical scanning device.

Referring to FIG. 8 an apparatus 120 configured to carry out the method disclosed herein is shown. In this exemplary embodiment the apparatus 120 comprises optical hardware 122, a microprocessor or similar computing device 124 and a memory 126. The optical hardware 122 is connected via an electrical link to the microprocessor 124. The microprocessor is in turn connected to the memory 126 via two electrical links. The apparatus 120 may be a scanning laser ophthalmoscope.

The optical hardware may in some embodiments include lenses and mirrors configured to carry out laser imaging of a retina. The optical hardware may transmit a laser into an eye 128 and receive back a reflected signal. The reflected signal comprises raw image data that may be used to construct an image of the retina within the eye 128.

In particular, the optical hardware 122 may include a polygonal mirror. The polygonal mirror may comprise at least one defective facet that may cause a striping anomaly to be present on optical images produced by the scanning laser ophthalmoscope.

The optical hardware 122 may be configured to transmit the raw image data to the microprocessor 124 where the image data may be processed to produce an image of a retina. The microprocessor may be configured to carry out the method described herein to mitigate any striping anomalies in an optical image. Therefore, polygonal mirrors and apparatuses that may otherwise be rejected may still be used effectively.

A mask 110 may be stored in the memory 126 and used to mitigate striping anomalies in each optical image produced by the scanning laser ophthalmoscope. Alternatively, a separate mask 110 may produced for each optical image.

In certain embodiments the method disclosed herein thereby provides a correction algorithm to enable automated correction of striping image artefacts may be provided.

The performance of an embodiment of the correction algorithm has been assessed using both blinded subjective measures (human observation) and an objective based metrics. Both subjective and objective testing was carried out on a test data set of twenty optical images (ten of these optical images were from polygonal mirrors that were classed as "failed due to striping" by human observation, and ten optical images were from a random set of "passed" polygonal mirrors). After processing with the correction algorithm all optical images were classed as passes in respect of both subjective and objective metrics.

In some cases a striping anomaly may result in pixels that have an increased intensity as opposed to the decreased intensity described above. In certain embodiments the method may be adapted to mitigate these errors.

The skilled person will identify further embodiments without departing from the scope of the invention as claimed.

The invention claimed is:

1. A method comprising:
   determining an intensity gradient between first optical image data and second optical image data of an optical image produced by an optical scanning device, wherein the first optical image data is a first optical image pixel and the second optical image data is a second optical image pixel;
   determining an intensity gradient image comprising a plurality of intensity gradient image pixels, each intensity gradient image pixel of the plurality of intensity gradient image pixels representing a magnitude of the intensity gradient;
   identifying one or more anomalies in the optical image in dependence on the magnitude of the intensity gradient being greater than or equal to a threshold value;
   running a modulo-n averaging filter on each row of intensity gradient image pixels of the plurality of intensity gradient image pixels to produce an averaged intensity gradient image comprising a plurality of averaged intensity gradient image pixels; and
   wherein n is an integer corresponding to a pixel spacing between striping anomalies.

2. The method according to claim 1 further comprising correcting the one or more anomalies in the optical image in dependence on the magnitude of the intensity gradient.

3. The method according to claim 1 wherein the first optical image pixel and the second optical image pixel are adjacent.

4. The method according to claim 1 wherein the intensity gradient is a first order differential.

5. The method according to claim 1 wherein the intensity gradient comprises a difference between an intensity of the first optical image pixel and an intensity of the second optical image pixel.

6. The method according to claim 1 wherein the identifying the anomalies comprises identifying the second optical image data as anomalous in dependence on the intensity gradient between the first optical image data and the second optical image data being negative and having a magnitude greater than the threshold value.

7. The method according to claim 1 wherein the identifying the anomalies comprises identifying the first optical image data as anomalous in dependence on the intensity gradient between the first optical image data and the second optical image data being positive and having a magnitude greater than the threshold value.

8. The method according to claim 1 wherein each intensity gradient image pixel of the plurality of intensity gradient image pixels represents an intensity gradient between a pair of optical image pixels adjacent each other in a direction transverse to a scanning direction of the optical scanning device.

9. The method according to claim 1 wherein the identifying anomalies in the optical image is in dependence on the intensity of an averaged intensity gradient image pixel of the plurality of averaged intensity gradient image pixels being greater than or equal to the threshold value.

10. The method according to claim 1 wherein n is a number of facets on a polygonal mirror comprised in the optical scanning device.

11. The method according to claim 1 wherein the running the modulo-n filter comprises running the modulo-n filter in a forward direction and a backwards direction.

12. The method according to claim 11 wherein the running the modulo-n filter comprises averaging results of filtering in the forward direction and filtering in the backwards direction.

13. The method according to claim 1 wherein the identifying anomalies in the optical image is in dependence on an intensity of a first averaged intensity gradient image pixel of the plurality of averaged intensity gradient image pixels having a same intensity as a second averaged intensity gradient image pixel in a corresponding position of at least one of a row above and a row below of the averaged intensity gradient image.

14. The method according to claim 1 comprising producing a mask comprising the averaged intensity gradient image.

15. The method according to claim 14 comprising correcting the optical image to remove the one or more anomalies by subtracting the mask from the optical image.

16. A computer program product comprising a non-transitory computer-usable medium having computer-readable program code embodied thereon, the computer-readable program code adapted to be executed to implement the method according to claim 1.

17. An apparatus comprising a processor configured to carry out the method according to claim 1.

18. An imaging device comprising the apparatus according to claim 17.

* * * * *